Jan. 12, 1965  R. H. DICKE  3,165,705
GAS CELL FREQUENCY STABILIZATION
Filed April 30, 1958  7 Sheets-Sheet 1

INVENTOR.
ROBERT H. DICKE
BY
ATTORNEY

Fig. 2.

INVENTOR.
ROBERT H. DICKE

Jan. 12, 1965 R. H. DICKE 3,165,705
GAS CELL FREQUENCY STABILIZATION
Filed April 30, 1958 7 Sheets-Sheet 6

INVENTOR.
ROBERT H. DICKE
BY
ATTORNEY

Jan. 12, 1965  R. H. DICKE  3,165,705
GAS CELL FREQUENCY STABILIZATION
Filed April 30, 1958  7 Sheets-Sheet 7

INVENTOR.
ROBERT H. DICKE
BY
ATTORNEY 3,165,705
GAS CELL FREQUENCY STABILIZATION
Robert H. Dicke, 321 Prospect Ave., Princeton, N.J.
Filed Apr. 30, 1958, Ser. No. 732,036
19 Claims. (Cl. 331—3)

The present invention relates, in general, to improved systems employing media which are resonant at frequencies characteristic of atomic or molecular transitions. More particularly, the invention relates to improved systems of the above type in which the spectral line breadth is effectively sharply decreased (the Q of the atomic or molecular resonance sharply increased) and such systems used as part of an improved arrangement for stabilizing the frequency, within very narrow limits, of an "atomic clock."

It is now well-known that a very sharp electromagnetic wave resonance can be obtained from certain gases under certain conditions. As an example, a sharp resonance in the microwave frequency range can be obtained from an alkali metal gas. In one known system, the metal gas is combined with a buffer gas such as argon in order to reduce the Doppler broadening of the resonance. A weak magnetic field is applied to the gas to resolve the degeneracy of two levels of the ground state of the gas. The gas is then "optically pumped," that is, it is excited by applying light thereto from a source containing the same gas. The optical pumping, which may employ polarized light transmitted in the direction of the applied magnetic field, causes certain absorbing magnetic sublevels of the ground state to become less populated and others to become more populated. Microwave transitions are possible, for example, between the $F_1$ and $F_2$ levels of the ground state. If a microwave is then applied to the gas, at a frequency which is characteristic of the transition between particular magnetic substates of the ground state, say $F=2$, $m_F=0 \rightarrow F=1$, $m_F=0$, the gas will exhibit a resonance at this frequency.

One object of the present invention is to provide improved systems for effectively narrowing the frequency band at which the resonance occurs.

Another object of the invention is to provide an arrangement of greatly improved sensitivity for detecting the resonance.

Yet another object of the present invention is to provide an improved atomic clock.

Still another object of the present invention is to provide improved optical detection systems for resonant gas systems.

The present invention employs a medium which is resonant at a microwave frequency which is characteristic of atomic transitions in the medium. The medium can also be excited by electromagnetic waves of another, higher frequency. Preferably, the medium consists of an alkali metal gas such as sodium, potassium, or the like mixed with a buffer gas, and the electromagnetic wave excitation at the higher frequency consists of light (optical pumping) applied to the alkali metal gas from a lamp containing the same alkali metal. The microwave transition may be an atomic transition between two levels of the ground state of the gas and may be induced by an applied microwave of proper frequency. It has been found that the medium, after excitation by the optical radiation, changes the polarization of a beam of polarized light of proper wavelength applied thereto. Accordingly, this beam has a different polarization when it emerges from the medium than when it enters the medium. Changes from this different polarization indicate an interaction between a wave at the microwave resonant frequency applied to the medium and the medium itself. These changes can be detected with great sensitivity.

In a preferred form of the invention, the polarized light passing out of the medium is made to pass through polarizing means oriented to pass little or no light in the absence of transitions in the medium at the atomic resonance frequency. If a wave at a frequency which produces transitions is then applied to the medium, the light polarization the medium introduces is changed, whereby the polarizing means passes some light. The amount of light passed is an indication of the amount of interaction between the wave and the medium and, accordingly, a measure of the closeness of the wave frequency to the atomic resonance frequency.

In other forms of the present invention, the resonance of the medium is greatly enhanced by adding additional excitation. The additional excitation is that produced by an audio-frequency wave at a frequency which is characteristic of a transition between magnetic substates $m_F$ of one of the levels ($\Delta F=0$) of the ground state of the medium. The audio-frequency wave causes the population of some of the magnetic substates at this level to be increased at the expense of other magnetic substates at the same level. A magnetic substate whose population is thereby increased is in a position to produce an atomic resonance of greatly increased intensity upon the application of a microwave at an atomic resonance frequency involving that substate.

The greatly improved arrangements for detecting atomic resonance described in the preceding paragraphs have important application in atomic clocks. In such arrangements, the optically detected signal is converted to an error signal which is used to stabilize the microwave oscillations applied to the resonant medium. In a preferred form of stabilization arrangement, the frequency of the oscillator generator is shifted between two discrete frequencies equally spaced from the resonance frequency of the medium. Thus, the optically detected output, when the generator is on frequency, consists of two signals of equal intensity. If the oscillator frequency should shift, the detected signal intensity increases on one side of the resonant frequency and decreases on the other. The difference between the two signals may be used in a feedback arrangement for shifting the center frequency of the oscillator back to the resonance frequency.

The line breadth (the width of the microwave frequency band over which transitions occur) of an atomic resonant, alkali metal gas is determined by electron exchange between metal atoms when the vapor pressure is high. For lower gas pressures the line breadth is determined by other factors and is much narrower than at the higher pressures. However, at the lower gas pressures the amount of interaction between the gas and an applied microwave signal is low and is difficult to detect by conventional means. An important advantage of the optical detection systems described above is their extreme sensitivity. They permit the use of the alkali metal gas at much lower vapor pressures, and thereby greatly narrow the spectroscopic line breadth which can be obtained (greatly increase the Q of the atomic resonance). Accordingly, in an atomic clock, optical detection of the atomic resonance can maintain the clock frequency to within extremely narrow limits.

The invention will be described in greater detail by reference to the following description taken in connection with the accompanying drawings in which.

Throughout the figures, similar reference numerals are applied to similar parts.

Figure 1:
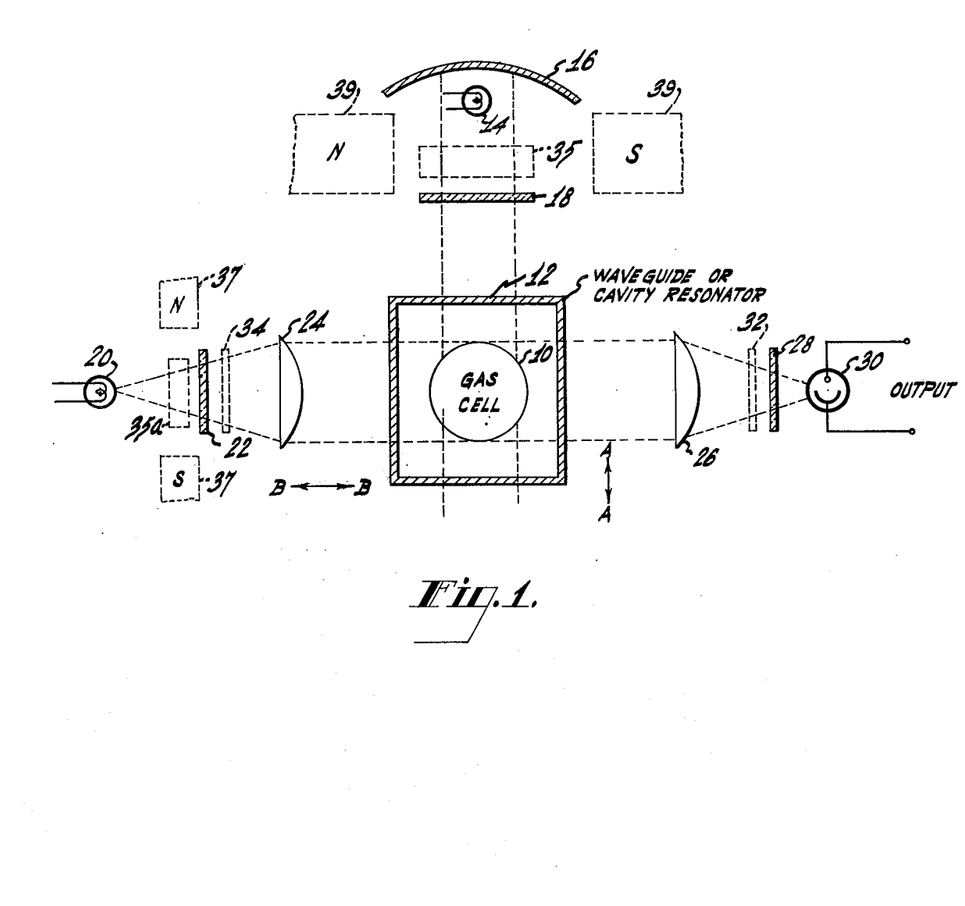
FIG. 1 is a schematic diagram of an improved optical detection system according to the present invention.

In the system of FIG. 1, a resonant gas is contained in a sealed-off container 10. The gas may be an alkali metal vapor such as sodium, potassium, cesium, rubidium, or any other gas which is monatomic and which has a doublet S ground state, and a non-zero nuclear spin. The gas is preferably mixed with a buffer gas such as spectroscopic grade monatomic helium, argon, neon, hydrogen or mercury. The container 10 may be a glass flask which, if desired, may be glazed with a thin layer of fused potassium fluorborate ($KBF_4$) to keep the alkali metal from discoloring the glass. The alkali metal may be deposited as a thin layer in the neck of the flask prior to sealing off the flask. The pressure of the buffer gas may be on the order from 1 to 10 millimeters of mercury. The vapor pressure of the alkali metal may be on the order of $10^{-5}$—$10^{-9}$ millimeters of mercury and may be adjusted by controlling the temperature. The optimum temperature at which atomic resonance occurs depends on the gas employed and for sodium may be of the order of 140° C. or so; for potassium of the order of 65° C.; and for rubidium of the order of 30° C.

The gas cell 10 is preferably positioned in a waveguide or cavity resonator illustrated schematically at 12, but, if desired, it may be unenclosed by a wave confining structure (not illustrated). Although not shown, the waveguide or resonator is formed with apertures in the walls thereof which are transparent to the electromagnetic waves used for exciting the gas. While the specific structure of such a waveguide or resonator is not illustrated, details may be found in application, Serial No. 525,441, filed on August 1, 1955, by the present applicant, now Patent No. 2,884,524, issued April 28, 1959. The waveguide or cavity resonator should be formed of a magnetic field permeable substance such as copper, aluminum, or the like since, as will be explained later, a weak magnetic field must be applied to the gas in order to resolve the degeneracy of the F levels of the ground state of the gas.

It is assumed for the purposes of the present discussion that the gas in cell 10 is sodium. In this case, the gas may be excited by applying light to the same from a sodium lamp 14. In the arrangement shown, a reflector 16 is positioned behind the lamp and a linear polarizing screen 18 in front of the lamp. Accordingly, the light which produces the optical pumping to be described in more detail later is, in this embodiment, linearly polarized. The polarizing screen 18 is so oriented that the electric vector of the light is in a direction perpendicular to the plane of the paper.

A second source of light at the same frequency as the light from source 14 is produced by sodium vapor lamp 20. This light passes through a second polarizing screen 22 and an optical system illustrated schematically by the single lens 24. The polarizing screen 22 is oriented to polarize the light at an angle of 45° with respect to the polarization of the optical pumping light (and the static, magnetic field described below). The light generated by source 20 which passes through the gas cell is imaged by a second optical system, illustrated by a single lens 26, through a third polarizing screen 28 and onto the cathode of a photocell 30.

There is also present in the arrangement of FIG. 1, a means for producing a static, weak magnetic field (having a strength of approximately 0.1 gauss or so) in a direction perpendicular to the plane of the paper. A field of this type may be produced by a coil (not shown in FIG. 1 but illustrated in FIG. 2) wound around the waveguide and a source of direct current connected to the coil. Finally, microwaves, at a frequency at which the sodium in cell 10 is resonant, are passed down the waveguide (in a direction perpendicular to the paper).

Figure 5:
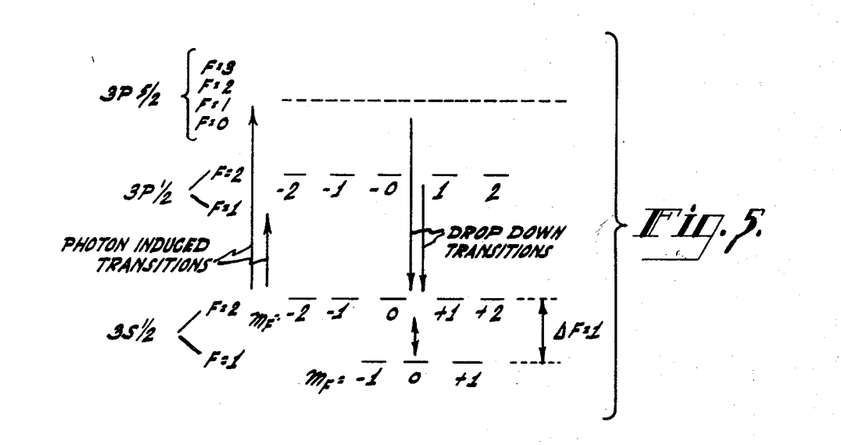
FIG. 5 is an energy level diagram to aid in explaining how various embodiments of the present invention operate.

In operation, the weak magnetic field applied to the gas in cell 10 resolves the degeneracy in the 3S 1/2 ground state of the gas. As shown in FIG. 5, the ground state resolves into two levels, $F=1$ and $F=2$. Each of these levels, in turn, consists of a plurality of magnetic substates $m_F$, five being shown for the $F=2$ level and three being shown for the $F=1$ level.

The intense polarized light applied by the optical system including source 14, reflector 16 and polarizing screen 18 causes optical pumping. The orientation of screen 18 is such that the electric vector of the light is parallel to the static, magnetic field. Referring again to FIG. 5, it is believed that atoms from the 3S 1/2 ground state of the gas are driven to the 3P 1/2 and 3P 5/2 states. The latter two stages are intermediate states and the atoms remain there for extremely short periods of time and then drop back to the 3S 1/2 state. However, the drop down transitions are such that the magnetic substates $m_F$ of the two F levels now have different populations than they had prior to the optical pumping. The resulting change in populations in the magnetic substates makes it possible for the microwave transitions between levels of the ground state according to the selection rule $\Delta F=1$ to result in further changes in populations of two or more of the magnetic substates.

The above transitions occur at different frequencies which are characteristic of the magnetic sublevels between which they occur and, in some cases, the applied magnetic field. However, the transition $\Delta F=1$, $m_F=0 \rightarrow 0$ is insensitive to applied magnetic fields and is therefore one which is of particular interest in frequency stabilization arrangements.

Referring still to FIGS. 1 and 5, when the gas in cell 10 is excited as described above, and polarized light from source 20 and polarizing screen 22 passes through the gas cell, the gas affects the polarization of the light in a manner dependent on the populations of the various magnetic substates of the ground states. If the applied light which is to be optically detected is linearly polarized and at 45° to the polarization of the optical pumping light, for example, the excited gas will change the polarization of the former by rotating the plane of polarization. The light may also become somewhat elliptical in polarization. It is believed that the atoms in the different magnetic substate of the ground state of the gas affect the quadrature components of the 45° linearly polarized wave differently, by generally absorbing one more than the other and possibly delaying one with respect to the other, thereby causing elliptical polarization. Changes in the populations of the magnetic substates cause changes in the rotation of the plane of polarization and possibly some differential delay (phase shift) and accordingly, possibly some change in the ellipticity of output polarized light. Polarizing screen 28 can be adjusted to a point at which the light striking photocell 30 is a minimum in the absence of an applied microwave. Preferably, a quarter wave plate 32 placed in front of the polarizing screen 28 may be used in order to substantially completely block the elliptical light from reaching photocell 30. If now, after the adjustment described above is made, a microwave at a frequency characteristic of the $\Delta F=1$, $m_F=0 \rightarrow 0$ atomic resonance is applied to the gas cell, it will induce transitions between these levels. These transitions affect the polarization of the wave passing through the cell. When this polarization is changed, the light passing through quarter wave plate 32 and polarizing screen 28 increases, as does the output of photocell 30. The amplitude of the output signal is indicative of the intensity of the applied microwave and, what is even more important, the frequency of the waves. Thus, for a wave of given intensity, any change from the atomic resonance frequency is indicated by a corresponding decrease in the intensity of the output of photocell 30. As will be explained in more detail later, this change in output of the photocell can be detected and used as the control signal for stabilizing the frequency of the microwave oscillator applying the microwave to the gas cell.

While in the arrangement of FIG. 1 linearly polarized light is used for optical pumping with a static, magnetic field perpendicular to the plane of the paper, it will be understood by those skilled in the art that unpolarized light, or circularly polarized light of the right or left hand sense can be used instead with the magnetic field in the direction A—A. As is also understood, the type of polarization of the wave used for optical pumping determines whether the photon induced transitions follow the selection rule $\Delta m = 0, +1,$ or $-1$. It should also be appreciated, that although the light which is later optically detected is shown as being initially linearly polarized, it can be initially circularly or elliptically polarized instead. In the latter cases a quarter wave plate would be required beyond the polarized screen 22, as shown by the dashed plate 34 in FIG. 1 and the magnetic field may be in the direction B—B. If the light which is to be optically detected is circularly polarized to start with, a different adjustment is necessary for plate 32 and screen 28 to produce a null at the photocell.

The illustration of FIG. 1 is, of course, schematic. In a practical system, care should be taken to shield photocell 30 from the light used for optical pumping. This can be done with appropriate aperture stops (not shown). It is also possible in the arrangement of FIG. 1 to place the polarizing screens between the lenses and the gas cell rather than as shown. Also, a lense system can be used instead of reflector 16.

At the cost of some additional complication, an improved system can be obtained by interposing a second gas cell between the lamp 14 and the polarizing screen 18. This is shown in phantom view at 35. The second gas cell should contain a somewhat higher pressure of alkali metal vapor (on the order of .01 micron). It serves as a selective filter to transmit preferentially only certain of the hyperfine components of the resonance line. The filter performs an absorbing function which would otherwise be performed in cell 10 itself and its use enables one to obtain a substantially narrower microwave resonance.

The system can be further improved by adding a second filter 35a in the optical detecting path of the gas cell arrangement of FIG. 1. This is also shown in phantom view in FIG. 1. Preferably, each gas cell 35, 35a is enclosed in an oven in order to control the temperature of the gas cell. For the sake of drawing simplicity, the oven is not illustrated in FIG. 1 but may be an enclosure with mica windows which will permit the light from lamps 14 or 20 to pass through the oven and filter without being affected substantially by the oven. It is also preferable to include associated with the filter, means for producing a static, magnetic field which is perpendicular to the plane of the paper or in directions A—A or B—B. One form of such means is illustrated at 37 and 39 respectively. The magnetic field produces a Zeeman splitting effect in the gas of the filter causing some of the gas molecules to be shifted and others to remain substantially unaffected. This causes certain spectral lines to be more strongly absorbed than the others and enhances the operation of the system.

It is well known to those skilled in the art that the absorption of radiation of various plane polarizations is only strongly affected by the population of the ground states of the atomic gas when there is a substantial difference in intensity of the various hyperfine components of the resonance light. It is therefore desirable to bring about this intensity difference by interposing the filter 35a.

It should be further mentioned that although illustrated as a gas filled cell, the filters 35a and 35 can instead be other types of filters. For example, they may comprise dichroic mirrors. The chief usefulness of the dichroic mirror is in place of the filters 35a or 35 or in addition thereto to eliminate one or the other of the two components of the fine structure. It can also be used to filter out hyperfine components which are split by the large ground state splitting of the hyperfine structure of the resonance radiation.

The other embodiments of the invention to be described below also give improved performance with the filters described in the preceding paragraphs. For the sake of drawing simplicity, these filters are not illustrated in many of the figures but it is to be understood that they may be included, if desired. In the case of the arrangement of FIG. 3, a single filter affects both the optical pumping channel and the optical detecting channel. A single filter is shown at 95. It too, is preferably included in an oven and preferably has a static, magnetic field applied. Alternatively or in combination with the filter 95, there may be a gas filter cell 95a in the detector light path only.

Figure 2:
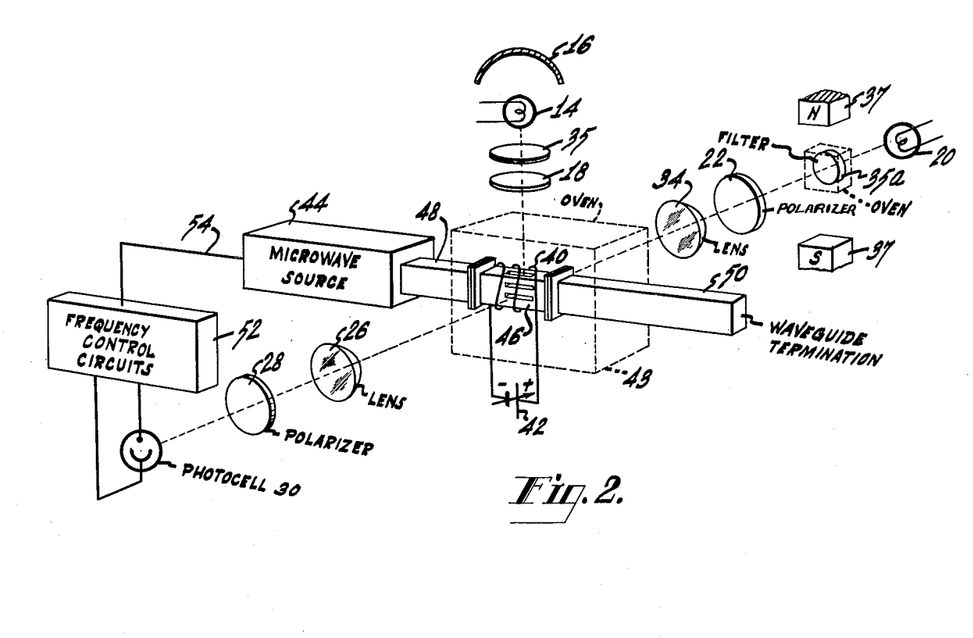
FIG. 2 is a perspective, partially schematic, and partially block diagram of the arrangement of FIG. 1, showing in more detail the spatial arrangement of various of the components of FIG. 1.

One possible spatial arrangement of the system of FIG. 1 is shown in FIG. 2. Similar reference numerals are applied to similar elements. Note that the optical pumping light beam is perpendicular to the optically detected light beam although, as will become clear from embodiments of the invention described later, other orientations are possible. The means for producing a magnetic field is shown as consisting of a coil 40 and a D.C. source shown as battery 42. The temperature of the gas cell may be adjusted by means of an oven shown schematically at 43. The oven may, if desired, be sufficiently large to include the optical system or may be formed with light transparent openings such as mica windows or the like. The microwave source is shown at 44 and it applies its energy to the gas cell in waveguide section 46 via waveguide coupling section 48. Although waveguide section 46 is shown as being of the same size as section 48, this need not be the case. Section 46 may be of larger size than section 48 and, in some circumstances, section 46 may be a cavity resonator similar to the one shown in the Dicke application previously referred to. As will be explained in more detail later, the microwaves applied to the gas cell are of relatively feeble intensity. If desired, a waveguide termination may be added to the structure, as shown at 50, to prevent reflections.

When the arrangement shown is part of a frequency stabilization system, the output of photocell 30 is applied to the frequency control circuits 52. An improved form of such circuits is described later in connection with FIG. 7. The output of the frequency control circuits may be a direct voltage and it may be applied to the microwave source via lead 54.

Figure 3:
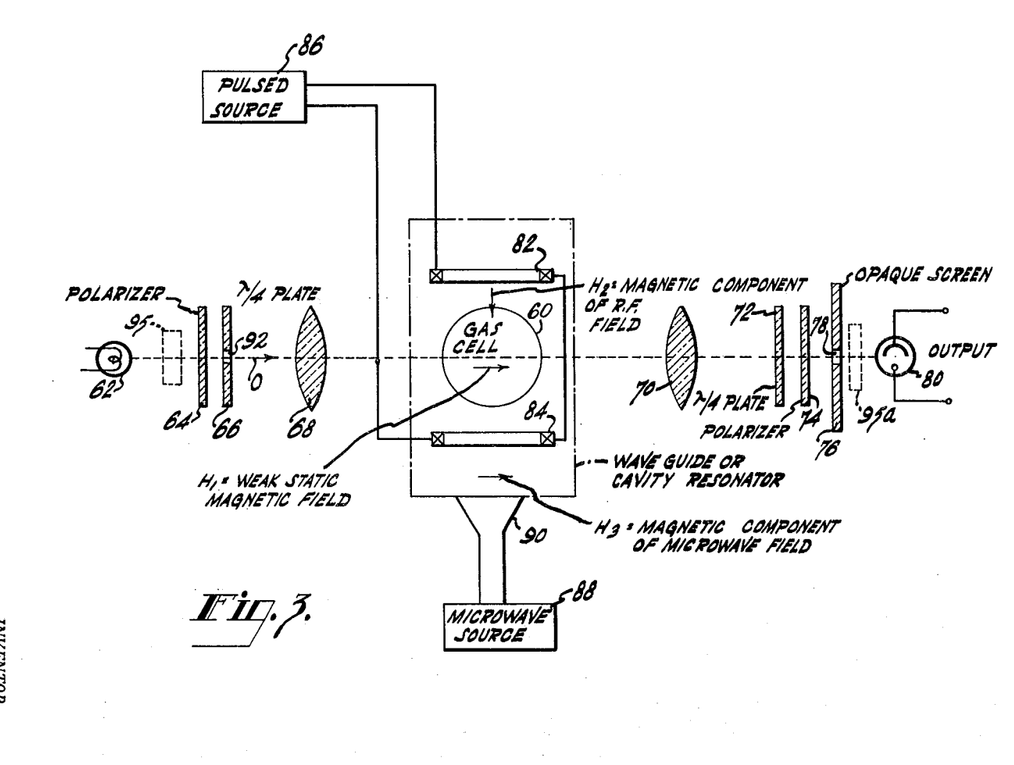
FIG. 3 is a block and schematic diagram of another embodiment of an optical detection system according to the invention.

An improved form of detection system is shown in FIG. 3. Gas cell 60 is of the type previously described. Light from a source 62 containing the same gas as the cell passes through a polarizing screen 64, a quarter wave plate 66, and an optical system shown as lens 68. After passing through the gas cell, the light enters a second optical system, shown as lens 70, a quarter wave plate 72, a polarizing grid 74 and an opaque screen 76 formed with an aperture 78 therein. Any light passing through the aperture is detected by photocell 80. A magnet or coil, not shown, produces a weak, magnetic field $H_1$ in a direction parallel to the optic axis O. Coils 82 and 84 are positioned to produce an electromagnetic field having a magnetic component $H_2$ which is perpendicular to the optic axis O. These coils are connected to a pulsed, audio-frequency source 86. A microwave source 88 applies its energy to the gas cell via a horn 90. The electromagnetic wave orientation is such that the magnetic component $H_3$ of the microwave field is perpendicular to the magnetic component $H_2$ of the radio-frequency field and parallel to the optic axis.

In operation, polarizing screen 64 converts the light incident thereon to linearly polarized light and the quarter wave plate 66 converts the linearly polarized light to circularly polarized light. Quarter wave plate 66 is formed with a central aperture 92, whereby the portion of the light passing through the aperture remains linearly polarized. The circularly polarized light applied to gas cell 60 produces the optical pumping. This increases the populations of the ground state hyperfine states of positive $m_F$ (or negative $m_F$ if the resonance radiation is circularly polarized in an opposite sense). In other words, referring to FIG. 5, if the light is polarized in one sense, the populations of the $m_F=1$ and $m_F=2$ substates of the 3S 1/2 ground state may be enhanced at the expense of the $m_F=-2$ and $m_F=-1$ substates.

The light which passes through the small aperture 92 in quarter wave plate 66 passes through the gas cell, through the quarter wave plate 72, the polarizer 74 and the aperture 78 in the opaque screen 76. This light, which starts out linearly polarized, after leaving the gas cell 60 is elliptically polarized, as the result of selective absorption in the gas cell. The quarter wave plate 72 and polarizer 74 may be orientated as to pass a small amount of light, or no light in the absence of microwave transitions in the gas cell, greater sensitivity being obtained with the adjustment which permits a small amount of light to pass. Thus, in the absence of a microwave applied by source 88, the output of photocell 80 is zero or close to it. The effect of applying a microwave at a frequency characteristic of a ground state transition such as $\Delta F=1$, $m_F=0\rightarrow 0$ is to modify the absorption properties of the gas in such a way as to change the amount of light transmitted to the photocell. In other words, the cell effectively changes the polarization of the light passing through it from what it was when there was no microwave excitation, whereby the amount of light passing through the quarter wave plate 72 and polarizer 74, and reaching the photocell is changed. Note in this connection that the opaque screen 76 prevents the circularly polarized light, which is used for optical pumping, from reaching the photocell. If necessary, means such as aperture stops may be employed completely to eliminate this light. These are not shown.

While the effect above occurs for an optically dense gas without the use of the audio-frequency coils 82, 84, it is more pronounced and occurs for a gas at lower pressure if the coils are employed in the following manner. The frequency of the audio-frequency signal applied to the coil is one which is chosen to produce a resonance precession of the angular momentum of the atoms in some one of the two hyperfine states $F=I\pm\frac{1}{2}$ causing this angular momentum to twist through an angle of $90°$ until it lies at right angles to the optical axis O. Referring to FIG. 5, the radio frequency is one which is characteristic of transitions between normally degenerate levels of the magnetic substates $m_F$ of a single level of the ground state ($\Delta F=0$).

The first audio pulse, therefore, leaves the gas in a condition for which atoms in the audio-resonant state (preferably $F=I+\frac{1}{2}$) are oriented at right angles to the static, magnetic field and are precessing about this field at the audio-frequency characteristic of this particular hyperfine state ($F=I+\frac{1}{2}$).

A second audio pulse, phase related to the first, is applied later to cause these precessing atoms to return to their original polarization state. This second pulse is effective to return the angular momentum of the gas to its original value only if the phases of the various magnetic substates of the resonant F state are left undisturbed between the two pulses.

If, however, there is a microwave resonance transition ($m_F=0\rightarrow m_F=0$) induced in the time interval between the two pulses, the phase relation of the $m_F=0$ state is disturbed and this badly disturbs the polarization after the second pulse. It may be noted that the phase is disturbed even if the populations of the two $m_F=0$ states are equal.

Figure 4:
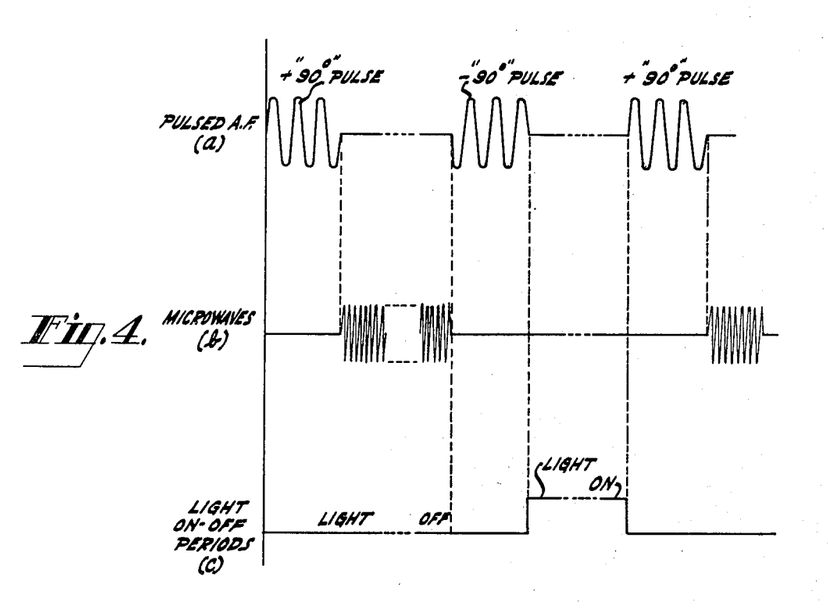
FIG. 4 shows waveforms present at various points in the arrangement of FIG. 3.

In a practical system, the operation of the arrangement of FIG. 3 may be as follows. The gas cell first has a weak static, magnetic field $H_1$ applied in the usual manner. It is then optically pumped by applying circularly polarized light to the cell as already described. Then, a pulse of audio-frequency energy is applied from source 86 to coils 82, 84 as indicated in FIG. 4a. This pulse can be called a $+90$ pulse as it serves to rotate the angular momentum of the resonant gas through $90°$ until it is perpendicular to the static, magnetic field $H_1$. After the $+90°$ pulse is applied, a microwave pulse is applied to the gas. This pulse induces a microwave transition. At the end of the microwave pulse a second audio-frequency pulse is applied to coils 82, 84. The second pulse is coherent with the first but $180°$ out-of-phase therewith. The effect of the microwave transitions which occur between the application of the $+90°$ and $-90°$ pulses is one of disturbing the $m_F=0$ states so that the $-90°$ pulse does not turn the angular momentum back to where it was prior to the application of the $+90°$ pulse. This results in a net change of state populations and a change in the light transmitted to the photocell.

Preferably, the audio-frequency source shown by a single block 86 consists of a gated oscillator. The oscillator frequency is preferably slightly different than that of the resonance precession of the angular momentum of the atom. The first time the pulse source is gated (the $+90°$ pulse of FIG. 4a) the angular momentum is made to twist through an angle of $90°$ and lies at right angle to the optic axis O. The microwaves are then applied and then the $-90°$ audio-frequency pulse is applied. The time interval between the application of the $+90°$ pulse and the $-90°$ pulse is such that the $-90°$ pulse opposes the resonance precession imparted by the $+90°$ pulse. In other words, it tends to make the angular momentum of the atom return to its original position, that is, parallel to the optic axis O. In the absence of a microwave transition, the amount of angular precession produced by the $-90°$ pulse would be substantially the same as that produced by the $+90°$ pulse so that the angular momentum would be parallel to the optic axis. However, if there is a microwave transition induced, the angular momentum of the atom is not returned to its original orientation, whereby the light intensity at the photocell increases.

In a preferred form of the invention, after the initial adjustment of the quarter wave plate 72 and polarizer 74, the light source 62 is turned on and off in synchronism with the applied audio-frequency and applied microwave pulses in the manner shown in FIG. 4c. Thus, the light is turned on between the application of a $-90°$ pulse and the application of a $+90°$ pulse and is turned off at all other times. During the light on period, light reaches the photocell, if there has been a microwave transition between the application of previous $+90°$ and $-90°$ pulses. It is desirable to turn the lamp off during the microwave transition phase to eliminate photon absorption as a mechanism for line broadening.

Other arrangements of optical equipment are possible. For example, it is possible to dispense with the hole in the quarter wave plate 66 and with the elements 72, 74, 76 and to simply monitor the intensity of the circularly polarized light. This intensity would be changed slightly by a microwave resonance. Also, the arrangement of light shown in FIG. 6 could be used. As the latter is fairly similar to the arrangement of FIG. 1, no detailed explanation is given. Similar reference numerals are, however, applied to similar parts.

Figure 6:
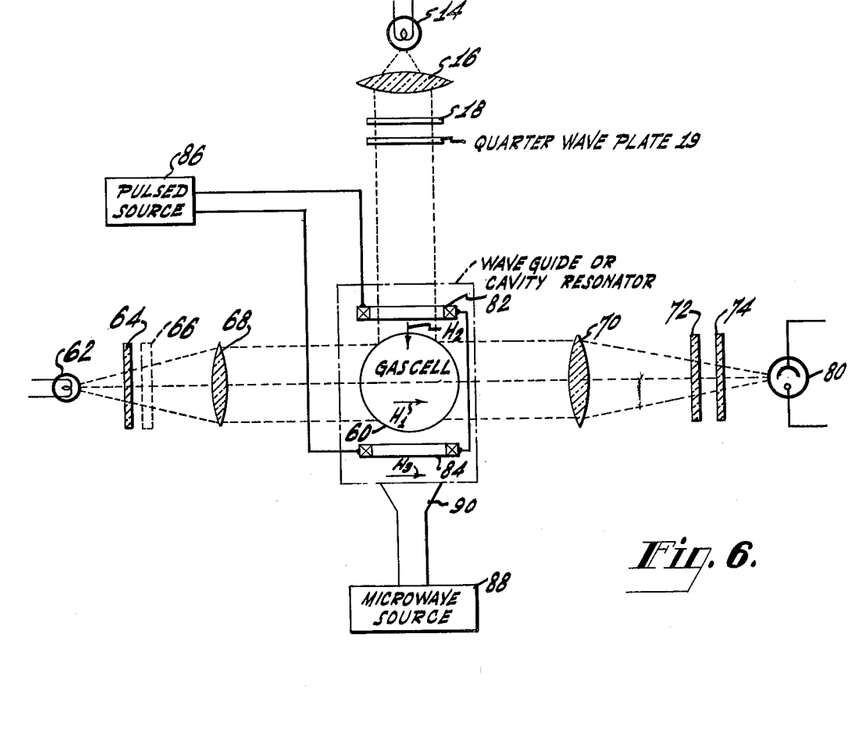
FIG. 6 is a modified form of the arrangement shown in FIG. 3.

In another form of the invention similar to the one shown in FIG. 3 (or 6), rather than being applied continuously between the application of the ±90° radio frequency pulses, the microwaves are applied in two coherent pulses which occur after the +90° pulse and before the −90° pulse. It can be shown that when applied in this manner, the line breadth of the microwave resonance may be substantially decreased—on the order of a factor of two.

Still other forms of the invention of FIG. 3 (or 6), are possible. Thus the arrangement may be operated with the audio-frequency signal applied to coils 82 and 84 continuously and with the microwaves applied continuously. Alternatively, the microwaves may be applied in pulses and the audio-frequency signal applied continuously. Also, it is possible to operate the system with the light 62 on at all times. In the arrangement of FIG. 6, it is possible to operate the system with both lights 14 and 62 on at all times but it is preferable that light 14 be pulsed in the manner shown in FIG. 4c and that light 62 be kept on continuously.

It is also possible to operate the embodiment of FIG. 3 (or 6) in still another manner. In this form of the invention rather than applying audio-frequency pulses to coils 82, 84, video pulses are applied instead. The video pulses should be sufficiently short so that they include components in their spectrum at the frequency which causes the transitions in one of the F levels ($\Delta F = 0$) of the ground state. In this case, the first video pulse will be applied in one polarity and the next video pulse in the opposite polarity, that is, one would be applied positive going and the other negative going.

Figure 9:
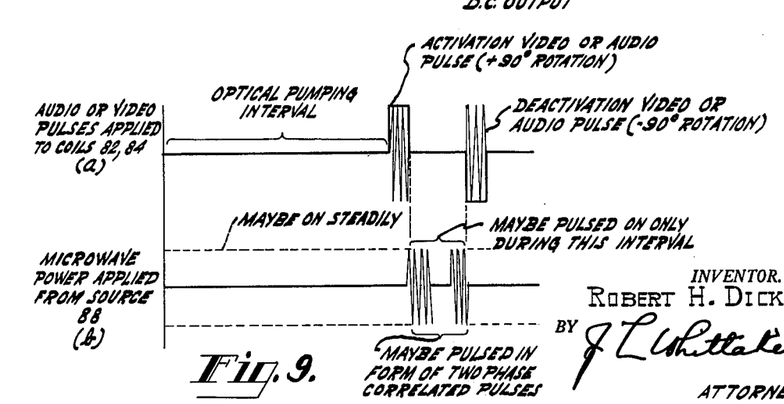
FIG. 9 shows waveforms to illustrate various modes of operation of the systems of FIGS. 3 and 6.

The various embodiments of the invention described above are not separately illustrated since they would be shown in the same way as the embodiments of FIG. 3 or 6. The differences among the various embodiments in principally in their mode of operation. FIG. 9 illustrates a number of the different alternative modes of operation. Thus, FIG. 9a shows that the activation (+90°) and deactivation (−90°) pulses may be audio or video pulses. FIG. 9b shows that the microwave power may be applied steadily, may be applied as a single pulse which occurs during the activation and deactivation pulses, or may be applied as two phase related pulses, one occurring slightly after the activation pulse and the other occurring slightly before the deactivation pulse.

In a typical system such as shown in FIG. 3 in which the excitation of coils 82, 84 is via applied audio-frequency pulses such as shown in FIG. 4a, typical parameters might be as follows. The static, magnetic field may be on the order of 0.01 gauss. For an alkali metal such as Na 23, the audio-frequency may be on the order of 7 kilocycles to produce transitions in the $F=2$ level of the ground state. This frequency will differ for other alkali metal vapors and for other system parameters such as other direct, magnetic field strengths, other F levels, etc. For example, if the magnetic field strength is increased substantially, the excitation frequency may extend into the radio-frequency region.

A frequency stabilization system employing one of the optical detection systems described above is shown in FIG. 7. For the purpose of illustration, the optical detection system of FIG. 1 is illustrated. However, it is to be understood that the systems of FIG. 3 or 6 can be used instead. A klystron 100 feeds a signal it is desired to stabilize into one of the arms 102 of a magic T, hybrid junction, illustrated schematically at 104. The energy passes equally to arms 106 and 108.

Figure 7:
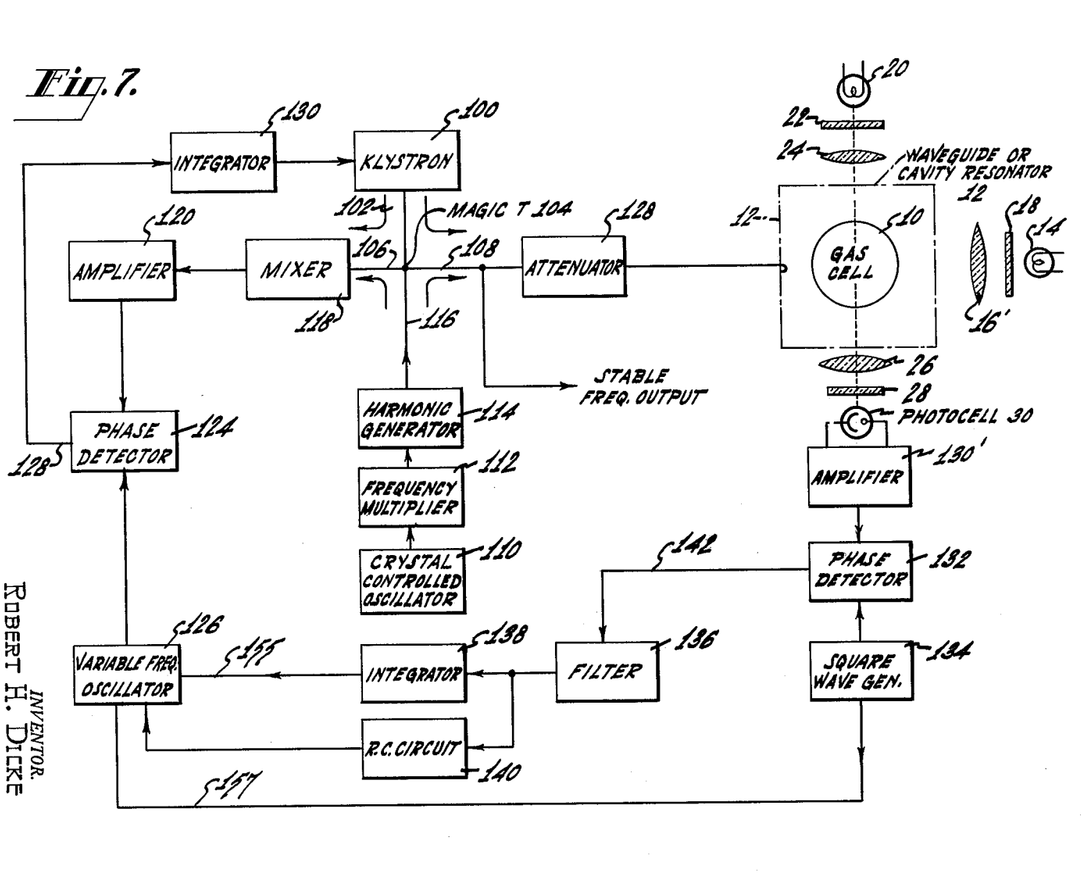
FIG. 7 is a block and schematic diagram of a frequency stabilization system according to the present invention.

A crystal controlled oscillator 110 supplies its output to a frequency multiplier 112, which, in turn, supplies a signal to harmonic generator 114. The output of the harmonic generator is a frequency substantially higher than that of the crystal controlled oscillator but at a much lower power level than the klystron signal. As an example, the klystron power may be on the order of 10 milliwatts whereas the harmonic generator power may be on the order of $10^{-15}$ watts or so. The harmonic generator frequency passes down arm 116 of the magic T and into arms 106, 108 of the magic T.

The mixer 118, which may be a crystal, produces a signal at the difference frequency between the klystron and harmonic generator frequencies. This difference frequency is amplified in stage 120 and applied to phase detector 124. The second input to the phase detector is a signal from variable frequency oscillator 126.

When the signal from the oscillator 126 is at the same frequency and phase as the signal from amplifier 120, no output appears on lead 128 of the phase detector. However, when the two inputs to the phase detector differ in phase, an output signal does appear at the phase detector. It is integrated in stage 130 and applied as a frequency control signal to the klystron 100. As is understood, the control signal may be a direct voltage which is applied to one of the tuning elements of the klystron and in a sense to reduce the output of the phase detector to zero, hence to effectively phase-lock the klystron to a frequency determined by the oscillators 110 and 126.

The phase-locked stable klystron, which operates at the sum (or difference) frequency of the variable frequency oscillator 126 and the harmonic generator 114, is used in the system of this invention as follows. The klystron signal appearing in arm 108 of the magic T is applied through an attenuator 128 to the gas cell 10. (The signal from harmonic generator 114 also goes to arm 108, but it is at such a low power level that it may be ignored.) The attenuator reduces the power level of the signal applied to the gas cell to a relatively low value—on the order of 30 db down, for example. The manner of application of the signal to the gas cell is schematically illustrated as a loop extending into the waveguide or cavity resonator 12. Numerous other means of applying the microwave to the gas cell are, of course, possible. The gas cell has been previously optically pumped in the manner already described. The signal optically detected by photocell 30 is amplified in stage 130 and applied as an input to phase detector 132. The second input to the phase detector consists of a square wave from generator 134. The square wave frequency is very low, on the order of 10 cycles per second, for example. The output of the phase detector is filtered in stage 136, integrated in stage 138 and applied to the variable frequency oscillator 126. The integration may be carried out through a D.C. motor and gear train, for example, the D.C. motor being the one which drives a frequency determining element in the variable frequency oscillator 126. RC circuit 140 is for the purpose of supplying a "rate" signal (a small prompt tuning signal) to the variable frequency oscillator in order to stabilize the feedback loop.

Figure 8:
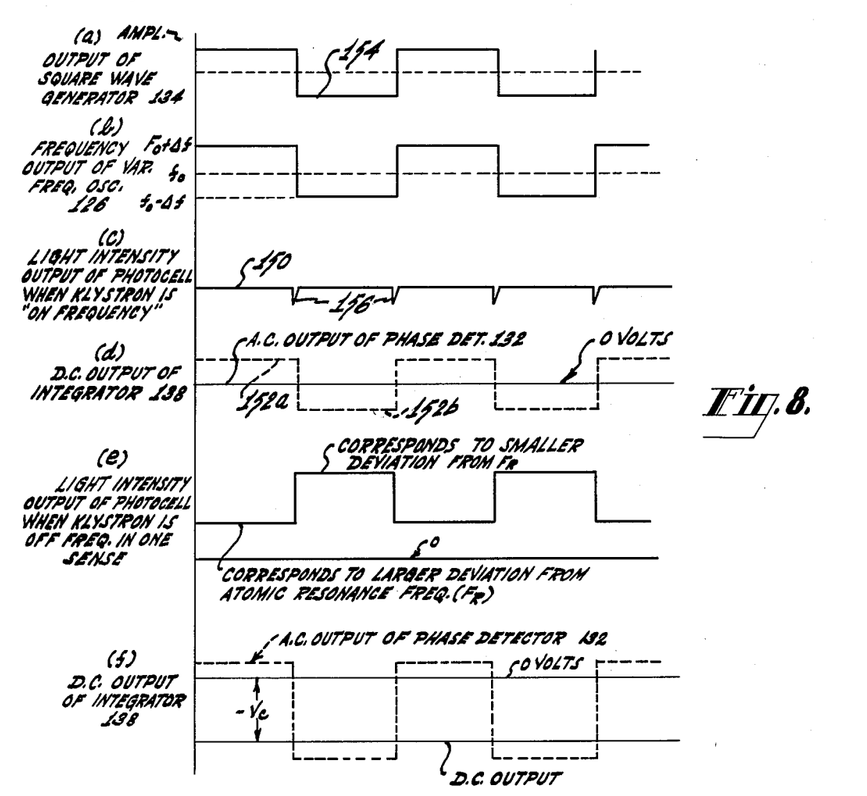
FIG. 8 is a drawing of waveforms to illustrate one mode of operation of the system of FIG. 7.

In operation, assume that the output of square wave generator 134 is as indicated in FIG. 8a. During the positive excursion of the square wave, the frequency of variable frequency oscillator 126 is shifted to a value $f_0 + \Delta f$. This frequency is compared with the frequency applied by amplifier 120 to the phase detector 124 and when they are the same, the output of the phase detector is zero volts. At that time, the klystron frequency is stabilized. Assume that the frequency at which the klystron is stabilized is 6,000 megacycles plus 30 cycles and assume also that 6,000 megacycles is at the atomic resonance frequency of interest of gas cell 10. At frequency 6,000 megacycles plus 30 cycles, the output of photocell 30 is some predetermined value as indicated at 150 in FIG. 8c. This signal is amplified by stage 130 and compared with the signal from square wave generator 134 (in phase detector 132). The circuit constants are such that under these conditions, a positive voltage 152a is applied to the integrator. It will shortly be shown that this is ½ cycle of a square wave 152a, 152b which is symmetrical about its base line. This square wave is shown in FIG. 8d. Upon integration of the square wave, a D.C. voltage of zero volts is obtained at lead 155. Thus, the klystron frequency is stabilized at 6,000 megacycles plus 30 cycles.

Assume now that the next half cycle of the square wave output of stage 134 occurs as shown at 154 in FIG. 8a. This voltage is applied via lead 157 to a tuning element in variable frequency oscillator 126 and shifts the oscillator frequency to a new value $f_0 - \Delta f$ as shown in FIG. 8b. There is now an output from phase detector 124 and the klystron frequency changes until the difference frequency between the output of harmonic generator 134 and that of the klystron is also $f_0 - \Delta f$. Under these conditions, the klystron frequency is 6,000 megacycles minus 30 cycles. If $+\Delta f = \Delta f$, as in the case under discussion, then the output of the photocell 30 remains constant as shown in FIG. 8c. The blips 156 are extremely sharp and occur during the transition of the klystron frequency from one value, through the atomic resonance frequency, to its other value. The blips are integrated in amplifier 130. Thus, the voltage applied by amplifier 130 to phase detector 132 for the klystron frequency 6,000 megacycles plus 30 cycles is a direct voltage, and is exactly the same as for the klystron frequency 6,000 megacycles minus 30 cycles. Accordingly, the output of the phase detector 132 during the negative portion of the square wave of FIG. 8a is of the same amplitude as, but of opposite polarity to the output of the phase detector during the positive portion of the square wave. The resultant signal, after integration, consists of a D.C. voltage having a value of zero volts as shown in FIG. 8d.

Assume now that for some reason the klystron frequency attempts to drift and that its output frequencies are 6,000 megacycles plus 50 cycles during the positive portion of the square wave and 6,000 megacycles minus 10 cycles during the negative going portions of the square wave (note that the frequency excursion of 60 cycles remains constant). Now, during the positive portion of the square wave, that is, when the output frequency is 6,000 megacycles plus 50 cycles, the klystron is much further off the atomic resonance frequency than it was formerly, and the amount of light reaching the photocell is substantially decreased. At its other frequency, 6,000 megacycles minus 10 cycles, the klystron is much closer to its resonant frequency and the amount reaching the photocell substantially increases. This is shown in FIG. 8e. The output of the phase detector is now no longer balanced. During the positive excursion of the square wave, a value of D.C. of given polarity of one amplitude occurs and during the negative excursion, a D.C. of opposite polarity and different amplitude occurs, as is shown in FIG. 8f. When this wave is filtered and integrated, a D.C. control voltage having a value other than zero is obtained and applied to the variable frequency oscillator 126. The D.C. control voltage is in a sense to produce a D.C. output at lead 128 which tends to reduce the klystron center frequency. A D.C. output remains until the klystron center frequency again reaches 6,000 megacycles whereby the light output of photocell 30 returns to its constant value.

What is claimed is:

1. A frequency stabilization system comprising, in combination, a gas which exhibits atomic resonance at a predetermined frequency; means for exciting the gas so that atomic resonance can occur; a frequency generator for applying a wave to said gas the frequency of which is varied between two limits equally spaced from said atomic resonance frequency; means for applying polarized light to the gas and for optically detecting changes in the polarization state of said applied light upon passage through the gas; and means responsive to differences in said polarization state at said two frequency limits for controlling the center frequency of said generator.

2. In combination, a medium which is resonant at a given electromagnetic wave frequency and in which transitions between quantum energy states can be induced by applied photon energy; means for applying a weak magnetic field to the medium; means for applying first photon energy to the medium to induce said transitions; means for applying polarized second photon energy of the same wave length as the first photon energy to the medium; means for detecting changes from a given polarization in said second photon energy when it passes through the medium; a frequency generator applying energy to a medium at the resonant frequency of the medium; and a control circuit responsive to said changes from said given polarization of said second photon energy for controlling the frequency of said generator.

3. In combination, a frequency generator which is capable of being shifted in frequency between two limits equally spaced from the resonance frequency of a resonant gas; a resonant gas to which energy from said generator at said two frequencies is applied; means for optically detecting transitions in the gas due to the energy at said frequencies applied thereto; and means responsive to the optically detected signal at the two frequencies for stabilizing the output of said generator at said two frequencies.

4. In combination, a frequency generator which is capable of being shifted in frequency between two limits equally spaced from the atomic resonace frequency of a microwave resonant gas; a microwave resonant gas to which the energy at said two frequencies is applied; means for optically pumping the gas; means for optically detecting microwave transitions in the gas at the two frequencies, the intensity of light detected at two frequencies being equal when the center frequency of said generator is at said atomic resonant frequency; and a frequency control arrangement for maintaining the center frequency of said generator at said atomic resonance frequency when the light at the two frequencies is of the same intensity and for returning the generator to its atomic resonance frequency when the light at the two frequencies is of unequal intensity.

5. In combination, a microwave resonant gas; means for optically pumping the gas; means for applying audio-frequency energy to the gas for increasing the population of atoms in one of the magnetic substates $m_F$ of the gas at the expense of one or more other magnetic substates $m_F$ of the gas in the same F level of the ground state of the gas; and means for applying a signal to the gas at a frequency characteristic of a $\Delta F = 1$ resonance of the ground state of the gas.

6. In combination, an atomic resonant gas; means for optically pumping the gas; means for applying a weak magnetic field to the gas; means for applying a pulse of audio-frequency energy to the gas the magnetic field of which is perpendicular to that of the static magnetic field and at a frequency which is characteristic of transitions between magnetic substates $m_F$ of the same F level of the ground state of the gas; means for applying microwave pulses to the gas at the resonant frequency of the gas upon termination of the audio-frequency pulse, thereby inducing microwave transitions in the gas; means for applying a second audio-frequency pulse to the gas which is coherent with the first audio-frequency pulse but which is 180° out-of-phase therewith; and means for detecting microwave transitions in the gas after termination of the second audio-frequency pulse.

7. In the combination as set forth in claim 6, the last-named means comprising means for optically detecting said transitions.

8. In the combination as set forth in claim 7, said means for applying microwave pulses to said gas including a microwave generator, and said combination further including means responsive to said optically detected transitions for maintaining the output of the frequency generator stable.

9. An optical detection system for an atomic resonant gas comprising, in combination, means for optically pumping said gas, a source of light at a frequency which is capable of causing photon transitions in the gas, a polarizing screen for linearly polarizing said light, a quarter wave plate formed with a central aperture therein placed beyond the polarizing screen for producing circular polarized light, a gas cell placed beyond the quarter wave plate through which the circularly polarized light passes; a second quarter wave plate placed in half the light emitted from the gas cell; second polarizing means placed in the path of the light beyond the quarter wave plate, the second quarter wave plate and second polarizing means being orientated to pass a small amount of the light passing through the aperture in the first quarter wave plate in the absence of microwave excitation of the gas; and optical detecting means for detecting changes in the intensity of the light passing through said aperture and gas cell.

10. In combination, a microwave resonant gas; a source of light containing the same resonant gas; a transparent container containing the same resonant gas positioned between the source of light and the microwave resonant gas; and an optical system for applying the light filtered by said transparent container to the microwave resonant gas for optically pumping the microwave resonant gas.

11. In combination; an atomic resonant gas; means for optically pumping the gas; means for applying a weak magnetic field to the gas; means for applying electromagnetic energy to the gas at a frequency to induce a $\Delta F=0$ transition therein, said means including means for applying a signal at an audio-frequency characteristic of such a transition to the gas; means for applying electromagnetic energy to the gas at a frequency to induce a transition $\Delta F=1$ therein; and means for detecting when the last-named transition occurs.

12. In combination, an atomic resonant gas; means for optically pumping the gas; means for applying a weak, magnetic field to the gas; means for applying electromagnetic energy to the gas at a frequency to induce a $\Delta F=0$ transition therein, said means including means for applying spaced video pulses of opposite polarity to the gas; means for applying electromagnetic energy to the gas at a frequency to induce a transition $\Delta F=1$ therein; and means for detecting when the last-named transition occurs.

13. In combination, an atomic resonant gas; means for optically pumping the gas; means for applying a weak magnetic field to the gas; means for applying electromagnetic energy to the gas at a frequency to induce a $\Delta F=0$ transition therein, said means including means for applying spaced audio-frequency pulses of opposite phase to the gas, the audio-frequency being one which is characteristic of a $\Delta F=0$ transition in the gas; means for applying electromagnetic energy to the gas at a frequency to induce a $\Delta F=1$ transition therein; and means for detecting when the last-named transition occurs.

14. In combination, an atomic resonant gas; means for optically pumping the gas; means for applying a weak magnetic field to the gas; means for inducing a $\Delta F=0$ transition in the gas comprising means for applying spaced audio-frequency pulses of opposite phase to the gas; means for inducing a $\Delta F=1$ transition in the gas comprising means for applying a microwave pulse thereto which starts when one audio pulse terminates and terminates when a following audio pulse starts; and means for detecting said $\Delta F=1$ transition.

15. In combination, an atomic resonant gas; means for optically pumping the gas; means for applying a weak magnetic field to the gas; means for inducing a $\Delta F=0$ transition in the gas comprising means for applying spaced audio-frequency pulses of opposite phase to the gas; means for inducing a $\Delta F=1$ transition in the gas comprising means for applying spaced, phase related microwave pulses to the gas, one of said microwave pulses occurring immediately after said audio pulse and another said microwave pulse occurring immediately before the following audio pulse; and means for detecting when the $\Delta F=1$ transition occurs.

16. In the combination as set forth in claim 15, said atomic resonant gas comprising, an alkali metal gas and said means for detecting the $\Delta F=1$ transition in the gas comprising an optical detection system.

17. In the combination as set forth in claim 16, said filter comprising a gas cell.

18. In the combination as set forth in claim 16, said filter comprising a dichroic mirror.

19. In the combination as set forth in claim 16, said first-named means comprising two sources of light.

References Cited by the Examiner

UNITED STATES PATENTS

| | | | |
|---|---|---|---|
| 1,742,115 | 12/29 | Whitaker et al. | 333—21 |
| 2,423,383 | 7/47 | Hershberger | 324—58.5 |
| 2,449,166 | 9/48 | Hershberger | 324—58.5 |
| 2,714,661 | 8/55 | Norton | 324—78 |
| 2,714,663 | 8/55 | Norton | 324—79 |
| 2,793,360 | 5/57 | Beaumont | 331—3 |
| 2,836,722 | 5/58 | Dicket et al. | 250—211 |
| 2,837,649 | 6/58 | Hersberger. | |

OTHER REFERENCES

Physical Review, Jan. 15, 1958, vol. 109, No. 2, pages 381–385, "Spin Resonance of Free Electrons Polarized by Exchange Collisions," Dehmelt.

Eshbach et al.: "Apparatus for Zeeman Effect Measurements on Microwave Spectra," The Review of Scientific Instruments, vol. 23, No. 11, November 1952, pages 623–628, 623–628 relied upon.

Kastler: "Optical Methods of Atomic Orientation and of Magnetic Resonance," Journal of Optical Society of America, vol. 47, No. 6, June 1957, pages 460–465, pages 460–465 relied upon.

Dehmelt: "Slow Spin Relaxtion of Optically Polarized Sodium Atoms," Physical Review, vol. 105, No. 5, March 1, 1957, pages 1487–1489, pages 1487–1489 relied upon.

ROY LAKE, *Primary Examiner.*

BENNETT G. MILLER, GEORGE N. WESTBY, RICHARD M. WOOD, *Examiners.*